INVENTORS
GEORGE H. MORRISON
FOUAD TERA
RODNEY R. RUCH

United States Patent Office 3,489,508
Patented Jan. 13, 1970

3,489,508
ION EXCHANGE CATION PURIFICATION PROCESS
George H. Morrison and Fouad Tera, Ithaca, N.Y., and Rodney R. Ruch, Rockville, Md., assignors to Research Corporation, New York, N.Y., a non-profit corporation of New York
Filed Feb. 25, 1966, Ser. No. 530,131
Int. Cl. C22b 27/00, 29/00, 59/00
U.S. Cl. 23—23                                              3 Claims

ABSTRACT OF THE DISCLOSURE

Metal cations insoluble in concentrated hydrochloric acid and containing trace cation impurities are purified by passing a solution containing the cation together with the trace impurities through a column of cation exchange resin to adsorb the cations present in the solution, passing concentrated hydrochloric acid through the resin to immobilize the cation to be purified, and passing further acid through the resin to elute the trace impurities.

---

The present invention relates to a method for the purification of inorganic materials. In one specific aspect, it relates to a method for the purification of inorganic cations by association and/or precipitation ion exchange.

Modern technology has increased the need for higher purity inorganic materials. Various approaches including methods involving ion exchange have been devised for the purification of such materials. Ion exchange methods of separation are generally based on differences in selectivity of the various species for the resin, and preferential separations may be further effected in some cases by complexation of the ionic species in solution or by the use of chelating resins.

We have discovered a new approach that minimizes the aspect of selectivity and still preserves a number of the advantages of column ion exchange. This is accomplished by the immobilization of the cation to be purified as a matrix on the column by association and/or precipitation followed by the non-selective elution of as many elements as possible before break-through of the matrix by breakup of the associate and/or dissolution of the precipitate. It is necessary that the matrix be insoluble or only sparingly soluble in the eluent to prevent early breakthrough. The use of an eluent of high ionic strength greatly suppresses the adsorption of many species. Matrix cations whose chlorides are insoluble in concentrated hydrochloric acid, or such acid admixed with a compatible organic solvent, can be purified according to the process of the present invention.

More particularly, the present invention is a method for the purification of a metal cation insoluble in concentrated hydrochloric acid containing trace cation impurities which includes the steps of passing a solution containing the cation together with the trace impurities through a column of cation exchange resin to adsorb the cations present in the solution, passing concentrated hydrochloric acid through the resin to immobilize the cation to be purified, passing further acid through resin to elute the trace impurities, and recovering the thus purified cation from the resin.

The present invention has the advantage of requiring chemical reagents readily available in a high degree of purity thereby minimizing the chance of contamination. Only small volumes of eluants are required and the resins employed can be readily regenerated for reuse in the process. Generally speaking, the overall process is quick, convenient and economical.

The present process differs from those of the prior art in that the cation to be purified is immobilized by association and/or precipitation within the body of resin to form a matrix. The trace impurities are removed, more or less together, by non-selective elution, and at the same time, the immobilized cation is subjected to solvent washing. Thus, the present process combines in one system the beneficial attributes of purification by precipitation and by ion exchange.

Figure 1:
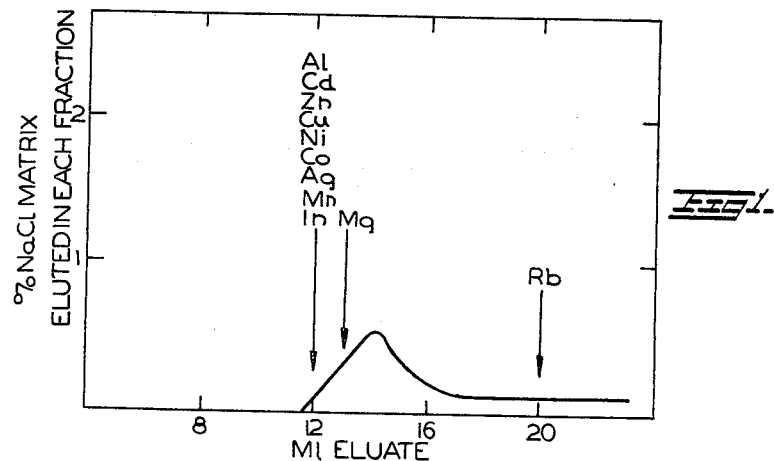
Figure 2:
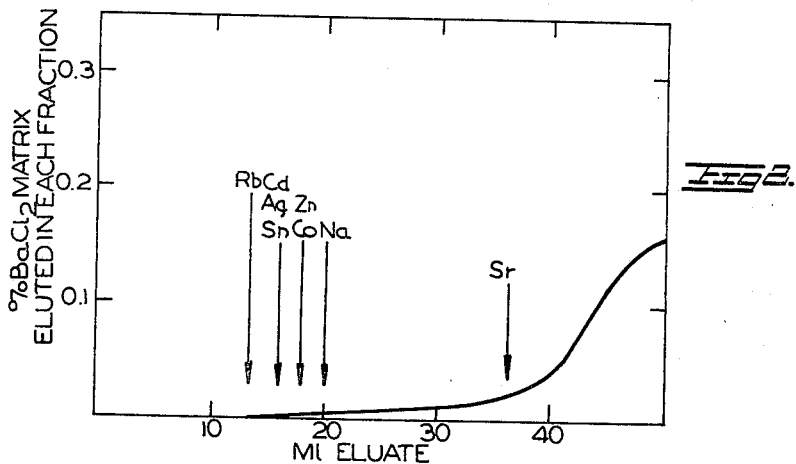
Figure 3:
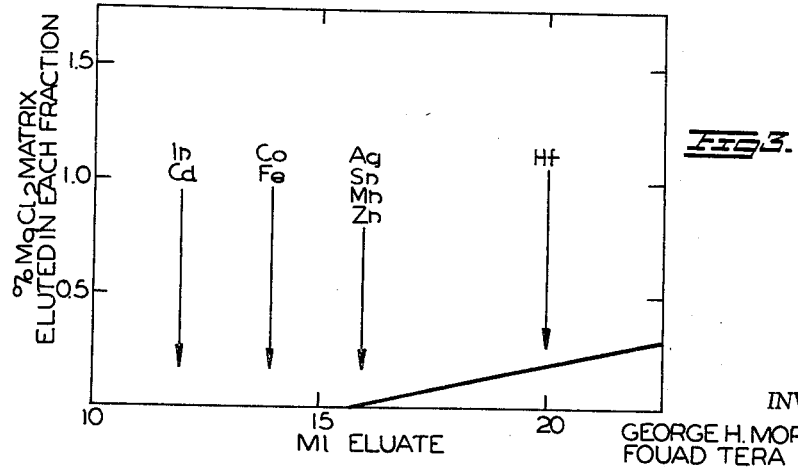

Our invention is further illustrated by means of the following discussion and examples and accompanying drawing wherein FIGS. 1–3 show, in graphical form, the results obtained in the purification of the representative cations $Na^+$, $Ba^{++}$ and $Mg^{++}$, respectively.

All reagents used were of reagent grade and employed without further purification. Sulfonated divinybenzene crosslined polystyrene cation exchange resins having various degrees of cross-linking were employed. The resin, preferably 100–200 mesh was purified by washing with large excesses of 6M and 2M HCl and washing thoroughly with distilled water until a negative acid test was obtained. Radioactive tracers employed were obtained from Oak Ridge National Laboratory, Isoserve, Inc., or produced in the Cornell University TRIGA Mark II Reactor.

Eluate fractions were obtained using a Research Specialties Co. automatic fraction collector. Radioactive counting equipment consisted of a sodium iodide well-type scintillation crystal and Baird-Atomic scaler. An ORNL Model VI flame photometer employing a 0.5-meter Ebert monochromator was used for flame photometric measurements.

The study of the recovery of trace elements from various matrices was performed using the following procedure, each trace element being studied individually. Whenever feasible, radioactive tracers were employed; otherwise, flame photometry or precipitation of the eluted trace was used. Confirmation of the reliability of the radioactive studies was established by flame photometric analysis. The studies of the various matrix and trace elements involved the following sequence: adsorption of the sample (matrix and trace) on the cation exchange resin, immobilization of the matrix on the resin, and elution of the trace elements.

Twelve milliequivalents of $Na^+$, $K^+$, $Ba^{+2}$, $Sr^{+2}$ or $Ag^+$ as the matrix element was adsorbed at a flow rate of 0.5–1 ml. per minute on a 0.8-cm. diameter column containing 7 ml. of wet divinylbenzene cross-linked, sulfonated polystyrene resin (Dowex 50–X8) and then washed with 3 to 5 ml. of water to ensure complete adsorption. The eluate from this operation containing elements that are not absorbed on a cation exchange column was collected and combined with the eluate obtained in the elution step below. The optimum resin volume was previously established by breakthrough experiments. The resin containing the adsorbed matrix and trace elements was then suction dried for 30 minutes. In the study of Sr as a matrix element, the resin was additionally washed with methyl alcohol to remove residual gel water to decrease the solubility of $SrCl_2$ during subsequent precipitation.

The dried resin containing the matrix and trace elements was transferred to a 1.1-cm. diameter column containing fresh resin previously equilibrated with 12.2 M HCl. The level of HCl in this second column was approximately 5 ml. above the resin. Complete transfer was facilitated by subsequent washing of the first column with 1 ml. of 12.2 M HCl. In runs with Ag both the column and eluent were maintained at ice bath temperature. At this point in the procedure, the low solubility of the matrix metal chloride in 12.2 M HCl resulted in its immobilization in the resin network.

The system was allowed to settle before the trace elements were eluted from the precipitated matrix using 12.2 M HCl at a flow rate of 0.3 ml. per minute. Only when BaCl₂ was used as a matrix was it necessary to elute with 6.1 M HCl after the initial precipitation with 12.2 M HCl. The eluate containing those trace elements that were not initially adsorbed on the resin was combined with the above eluate. In general 20 ml. of eluate was sufficient to recover the trace elements in greater than 90% yield with minimum accompaniment of matrix.

These experiments with the more insoluble chlorides indicated that breakthrough of the matrix could be sufficiently delayed in the case of BaCl₂, SrCl₂, NaCl, KCl, and AgCl to permit prior elution of trace elements. The volume of resin equilibrated with concentrated hydrochloric acid required in the column to delay breakthrough was found to depend on the solubility of the respective chlorides, the more insoluble BaCl₂ and SrCl₂ requiring 3.9 ml. and the NaCl, KCl, and AgCl requiring 11.5 ml. of resin. Although all of these salts are relatively insoluble in 12.2 M HCl, the residual water in the dried resin from the first column containing the adsorbed sample when eluted with 12.2 M HCl is displaced down the column causing some dilution of the acid, and therefore increasing solubility of the matrix chloride. Using a column of increased length served to delay breakthrough. An experiment to determine the effect of amount of matrix on its breakthrough revealed that doubling the amount of NaCl from 12 to 24 meq., initially adsorbed on 7 and 14 ml. of resin, respectively, resulted in breakthrough of NaCl at the same point but the amount coming through doubled.

Lowering the temperature of the column and eluent to ice bath temperatures decreased the amount of breakthrough of AgCl above five-fold rendering it applicable to this approach. The decrease from room temperature to about 1° C. was not, however, sufficient to decrease the solubility of LiCl, RbCl, CsCl, MgCl₂ or CaCl₂ for preconcentrating the trace cations for analytical purposes. A slight increase in the elution maximum for RbCl was observed as the lower temperature was used.

The study of the separation and preconcentration of trace cations by precipitation of the matrix on the cation exchange column was performed using 11 trace cations in 0.7 gram of NaCl matrix. The elution behavior of the various trace cations and matrix are shown in FIGURE 1, the arrows indicating the volume of eluate containing yields of 90% or higher of the various trace cations. Further elution always resulted in 100% yields but with the accompaniment of small amounts of the matrix due to its slight solubility in the additional volume of eluent. The amounts of trace studied in many cases varied from carrier-free isotopes to 10-mg. amounts with no apparent effect of concentration on the elution behavior.

Preconcentration of trace cations from 1.466 grams of BaCl₂ was studied using eight trace cations. In this case both 12.2 M and 6.1 M HCl were used as eluents, the latter being introduced after 10 ml. of the former had passed through the column. When only 12.2 M HCl was used, long tailing of the trace cations occurred, indicating partial trapping of these cations inside the resin gel because of the blocking of the gel network by the precipitated BaCl₂. Using 6.1 M HCl this effect was less pronounced, so that diffusion of water and electrolytes through the resin was facilitated. The results of the elution of trace cations from BaCl₂ matrix are shown in FIGURE 2, the arrows indicating the volume of eluate containing yields of 90% or higher of the various trace cations shown.

The generality of the approach to the separation and preconcentration of trace cations in a SrCl₂ matrix was substantiated using Na and Co traces. Complete recovery of Co and 81% recovery of Na were effected before elution of the matrix occurred. A higher recovery of Na, matrix-free, could have been achieved with a longer column. Similarly, 93% of the Co trace was recovered matrix-free from a KCl matrix using the same procedure. At ice-bath temperatures it was possible to recover 97% of a Co trace from an AgCl matrix in 16 ml. of eluate.

From these experiments it appears that the elution behavior of trace cations from the matrix precipitated on a cation exchange column is governed mainly by their distribution coefficients. Those trace cations added to NaCl which were recovered with a 90% yield or higher, either matrix-free or with minor matrix accompaniment, all have a $D_v$ less than 1. An exception was Rb where possible interaction between trace and precipitated matrix slightly delayed the elution of Rb. Since no tailing occurred here, the effect may be caused mainly by weak physical adsorption of the trace on the precipitate.

The elution of cations possessing a somewhat higher distribution coefficient such as Li ($D_v$ ca. 1) was delayed resulting in contamination with some matrix to a degree determined primarily by the distribution coefficient of the trace cation and the solubility of the matrix. In general, the lower the distribution coefficient of the trace cation and the less soluble the matrix, the higher the yield in a given column and the higher is the preconcentration factor.

Since many elements form negatively charged chloride complexes in concentrated hydrochloric acid as shown by their adsorbability on anion exchange resins, they will not be adsorbed significantly on a cation exchange resin under these conditions. This is also predicted on the basis of the mass action relationship. Notable exceptions are the strong adsorption of Fe(III), Ga(III), Sb(V), Th(IV), Sc(III), and Au(III) on strongly acidic cation exchange resins from concentrated hydrochloric acid. The lighter rare earth elements and Ca, Sr, Ba, Y, Ti, Zr, Hf and Tl show moderate adsorption ($D_v$ ca. 10) under these conditions. On the basis of the volume distribution coefficients in 12 M HCl summarized in Table I, it should be possible to predict the elution behavior of the elements.

TABLE I.—Estimated Volume Distribution Coefficients in 12 M HCl

| | |
|---|---|
| $D_v \ll 1$ * | Cs, Be, Mg, V⁺⁴, Mn, Co, Ni, Cu, Ag, Zn, Cd, Hg, Al, In, Sn, Pb, As, Sb⁺³, Bi, B(H₃BO₃), N(HNO₃), P(H₃PO₄), S(H₂SO₄), Se, Te, Po, Br, I, Ru, Rh, Pd, Re, Os, Ir, Pt |
| $D_v < 1$ | Li, Na, K, Rb, Pa, Cr⁺³, Mo, W, U⁺⁶ |
| $D_v$ of 1–10 | Ra, Y, R.E., Ti, V⁺⁵, Nb, Cr⁺⁶, Tl⁺³, Sr, Ba, Zr, Hf |
| $D_v$ of 10–100 | Ca, Sc, Th⁺⁴ |
| $D_v > 100$ | Ga, Au, Fe, Sb⁺⁵ |

* Arbitrary classification where most values are estimated to be less than 0.3 based either on behavior up to 9 M HCl or from observation in 12.2 M HCl elutions.

To a first approximation, it is possible to predict the elution volume of a trace cation from the relationship $$D_v = V_{max} - i$$

where $D_v$ is the volume distribution coefficient of the element, $V_{max}$ is the number of column volumes at which the element appears in maximum concentration, and $i$ is the fractional interstitial volume. With a knowledge of the breakthrough behavior of the matrix and the above equation, one can predict which trace cations can be obtained in high yield and what the preconcentration factor will be. According to Table I it should be possible to recover at least 30 trace elements from NaCl and at least 40 elements from BaCl₂ with high yields, matrix-free or with minor matrix contamination in a small volume. Cations with a $D_v$ greater than 1 cannot be separated matrix-free or with only minor matrix contamination by this approach unless the matrix is extremely insoluble. The matrix itself, however, can be purified.

It was found advantageous to have both the matrix and the trace cations adsorbed on the cation exchange resin before immobilization is effected. Thus, when precipitation occurred, the crystals of matrix formed over a large area in the network of the resin, permitting the efficient washing of the matrix and removal of adsorbed trace cations. Microscopic examination of the resin after precipitation revealed that the bulk of the precipitate existed inside the beads of the resin. The alkali and alkaline earth chlorides form fine crystalline precipitates in the column with a minimum of adsorption and occlusion of trace cations. The elution process provides efficient washing of the precipitate without appreciable solubility as would occur in a conventional gravimetric procedure. Also, the volume of eluate containing a high yield of the trace cations is much smaller than that obtained by washing of a precipitate by conventional means.

The effect of cross-linkage of the resin over the range of 4–12% on the elution of cations was examined using $SrCl_2$ as the matrix and found not to be a factor. The mesh size was examined in connection with the precipitation of $BaCl_2$ and a 100- to 200-mesh resin resulted in optimum behavior. A finer particle size resin (200- to 400-mesh) resulted in much longer elution times, whereas a coarser resin (20- to 50-mesh) resulted in much broadening and tailing of the elution curve of the trace cations.

In order to increase the scope of the method to provide for the improved preconcentration of trace cations from additional matrices, an eluent system resulting in decrease solubility of these matrices was required. The addition of compatible organic solvents to concentrated hydrochloric acid was found to greatly decrease the solubility of many metal chlorides as compared with concentrated hydrochloric acid alone while still maintaining low distribution coefficients for most trace cations. Miscible organic solvents such as ethers and alcohols gave the best results.

Dioxane is particularly preferred for this purpose because of its low dielectric constant, inert character, and excellent viscosity characteristics. Immiscibility results with concentrated hydrochloric acid and p-dioxane at concentrations higher than 70% by volume of the latter. The addition of ethyl alcohol at the higher dioxane concentrations avoided this immiscibility and extended the range of applicability to include matrices of Ni, Cr, Mn, Al, and Pb.

When using 70% dioxane-30% concentrated HCl systems, twelve milliequivalents of the matrix cation Li, Na, K, Mg, Sc, or Y was adsorbed at a flow rate of 0.5–1 ml./min. on a 1.1-cm. diameter column containing 18 ml. of water equilibrated Dowex 50W–X2 resin (the numeral after the X is indicative of the degree of cross-linking present). The cations Rb, Ca, Sr, Ba, and La were adsorbed on a column containing 20 ml. of resin. The columns were then washed with about 5 ml. of water. The eluate from this operation was collected and combined with the eluate obtained in the elution step below. The resins containing matrix cations Li, Na, K, Mg, Sc, or Y were column washed with 30 ml. of dioxane and suction dried for 30 minutes. The resins containing matrix cations Rb, Ca, and La were column washed with 15 ml. of a solution consisting of 7 parts dioxane and 3 parts water by volume. The resins containing Sr and Ba were treated directly according to the next step.

The dried resins containing matrix cations Li, Na, K, Mg, Sc, or Y were then transferred to a 1.1-cm. diameter column containing Dowex 50W–X2 equilibrated with a solution of 70% dioxane-30% concentrated HCl (v./v.). The level of solution above the equilibrated resin was 5 ml. for Na, K, Sc, and Y, and 10 ml. for Li and Mg. During the transfer the matrix containing resin was extensively stirred to avoid coagulation of the system. Care was taken not to disturb the lower column. This procedure is referred to as the two-column procedure.

A one-column procedure was employed for Rb, Ca, Sr, Ba, or La whereby excess wash liquid was drained from the column followed by gradual column elution (0.2–0.3 ml./min.) using dioxane-HCl solution to effect precipitation. After about 10 ml. of eluent had passed, the upper portion of the resin containing most of the matrix was stirred gently, care being taken not to disturb the lower part.

When using 81% dioxane-10% ethanol-9% concentrated HCl systems, twelve milliequivalents of the matrix $Ni^{+2}$, $Cr^{+3}$, $Mn^{+2}$, $Pb^{+2}$, or $Al^{+3}$ was adsorbed on 18 ml. of resin, washed with dioxane, and suction dried as described in the above procedure. The dried resin was then transferred to a 1.1-cm. diameter column containing 5 ml. of Dowex 50W–X8 resin equilibrated with the dioxane-ethanol-HCl solution, the level above the equilibrated resin being 10 ml. The system was allowed to settle and subsequently eluted at a flow rate of less than 0.3 ml./min.

Using an eluent system consisting of 70% dioxane-30% concentrated HCl, Li, Na, K, Rb, Mg, Ca, Sr, Ba, Sc, Y, and La demonstrated sufficiently delayed breakthrough, as well as diminished levels upon breakthrough, to permit their applicability to preconcentration of trace elements and matrix purification.

Matrix column behavior is governed by matrix solubility and $D_v$ in the particular eluent system. In general, the amount of expected saturated breakthrough corresponded to the solubility. In the case of Mg, the beneficial combination of intermediate $D_v$ and slight solubility in the above eluent system permited its applicability, whereas using just concentrated hydrochloric acid, the combined higher solubility and low $D_v$ of this matrix element resulted in prohibitive breakthrough.

Greatly improved breakthrough behavior of Na, K, Rb, Sr, and Ba was obtained using the mixed solvent system as compared with the results obtained for these matrices in the previous study using concentrated hydrochloric acid alone. Comparing the breakthrough behavior of NaCl using these two systems, the $D_v$'s are less than 1 and 6 and the solubilities are ca. 1 mg./ml. and ca. 0.2 mg./ml., respectively, for concentrated hydrochloric acid and 70% dioxane-30% concentrated HCl. Using 81% dioxane-10% ethanol-9% concentrated HCl, a matrix breakthrough of less than 0.1% in 16 ml. of eluate was obtained with Mn, Ni, Cr, and Al, and ca. 0.3% for Pb.

Trace recovery appears to be governed by two factors: a sufficiently low $D_v$ of the trace element, and the absence of physical or chemical interaction with the precipitate or combined precipitate-resin. In general, the lower the trace $D_v$, the higher the matrix $D_v$, and the more insoluble the matrix in the eluent system, then the higher the yield of a trace cation in a given volume and the higher the preconcentration factor.

The addition of an organic solvent to concentrated hydrochloric acid greatly enhances complex formation for most transition metals. This fact explains why consistently low $D_v$ valves were obtained for 22 trace elements studied in 70% dioxane-30% concentrated HCl as summarized in Table II.

Table II.—Summary of volume distribution coefficients for transition elements in 70% dioxane-30% concentrated HCl

| | |
|---|---|
| $D_v \leq 0.2$ | $Ga^{+3}$, $Rh^{+3}$ |
| $D_v = 0.4 \pm 0.1$ | $In^{+3}$, $Cr^{+3}$, $Mn^{+2}$, $Fe^{+3}$, $Sn^{+2}$, $Co^{+2}$, $Zn^{+2}$, $Ag^+$, $Cd^{+2}$, $Tl^+$, $Cu^{+2}$, $Hg^{+2}$, $Au^{+3}$, $WO_4^=$, $HfO^{++}$, $TaF_7^=$, $MoO_4^=$ |
| $D_v = 0.6 \pm 0.1$ | $Pd^{+2}$, $VO^{++}$ |
| $D_v = 0.8 \pm 0.1$ | $Mi^{+2}$ |

These values were determined using a 0.6-cm. diameter column containing 5 ml. of equilibrated Dowex 50W–X2 resin in the hydrogen form. Sample volume was 0.5 ml., flow rate 0.2–0.3 ml. per min., and 0.4 void column volume. From these data it is possible to assume chemically analogous traces will also possess low $D_v$ values. In addition, the whole realm of predominantly anionic species in Groups V, VI, and VII will have low affinities, so that one can reasonably expect that practically all trace elements except those of Groups I–A, II–A, and III–B will be generally applicable. These low selectivities, in contrast to high selectivities for Group I–A, II–A, and II–B elements, plus the greater insolubility of matrices, as shown previously, strongly suggested favorable trace-matrix separation.

This was substantiated by the effective separation of a number of trace cations from the 11 matrices which gave favorable breakthrough behavior in 70% dioxane-30% concentrated HCl. Table III indicates the volume at which a given trace element studied was recovered with a yield of 90% or better.

Table III.—Summary of trace behavior in Group I, II, and III matrices with 70% dioxane-30% concentrated HCl eluent

| Matrix | Trace (ml.) | | | | | | | | |
|---|---|---|---|---|---|---|---|---|---|
| | Mn | Zn | Cd | Co | Fe | Ag | Sn | In | Hf |
| $MgCl_2$ | 16 | 16 | 12 | 14 | 14 | 16 | 16 | 12 | 20 |
| KCl | 12 | 14 | 12 | 14 | | | | | |
| NaCl | | 13 | 14 | 14 | | | | | |
| RbCl | 18 | 18 | 16 | 16 | | | | | |
| LiCl | 14 | 14 | | | | | | | |
| $CaCl_2$ | 18 | | | | | | | | |
| $SrCl_2$ | 20 | | | | | | | | |
| $BaCl_2$ | 16 | | | | | | | | |
| $ScCl_3$ | 12 | 12 | | | | | | | |
| $YCl_3$ | | 14 | | | | | | | |
| $LaCl_3$ | 18 | | | | | | | | |

The results of a more detailed study of the recovery behavior of 9 trace cations from 1.214 gram of $$MgCl_2 \cdot 6H_2O$$

matrix are shown in FIG. 3. The arrows indicate the volume of eluate containing yields of 90% or higher. The amounts of trace cations studied were less than 1 mg., and in some cases were carrier free.

Trace cation recovery was briefly surveyed using 81% dioxane-10% ethanol-9% concentrated HCl. It was found that within 16 ml. of eluate, 97% of a Cd trace was separated from Al, Mn, and Cr matrices, while 98% of Fe, Cd, Zn, and Ag traces were separated from a Ni matrix. Within 12 ml. of eluate, 98% of a Cd trace was separated from Pb. With the exception of Pb (less than 0.3% matrix breakthrough), the trace cation recovery in all cases was accompanied by less than 0.1% matrix.

The recovery of traces of Mn and Zn from such matrices as Rb, Ca, and La presented some problems, although they were quantitatively recovered from the other matrices. The problem was alleviated by the use of a one-column technique, whereby the matrix was precipitated by the eluent after the column had been preconditioned to an organic solvent environment, in the absence of HCl, to suppress matrix solubility. This gradual precipitation condition permitted more efficient washing.

In most cases a visible solid phase interspersed within the resin was noted in the column following the precipitation step. However, in the case of Li, Ca, Y, Sc, and La chloride matrices no precipitate was observed. Although it is conceivable that a precipitate would most likely be imbedded within the resin network, microscopic examination of these systems after excess supernate had been removed failed to establish the presence of a crystalline phase. It is considered that matrix immobilization in the case of these five elements is effected by association of the matrix chloride with the resin in the presence of the organic-HCl solvent system.

The data presented here indicate that the generality of non-specific trace cation elution from immobilized matrices through precipitation or association on the column is extended and improved by the use of organic-HCl eluents and its use in the ultra purification of materials through exhaustive elution. This extension and improvement of the approach may be applied to the preconcentration of many trace cations from a variety of high purity materials and also biological matrices containing large amounts of Groups I and II elements. This preconcentration approach has great potential for the analysis of high purity alkali and alkaline earth salts in the parts per billion range. The sensitivity of existing analytical techniques for impurities in these electronically important materials is greatly limited because of the effect of the matrix, either as an interference, as a diluent which limits the attainment of ultimate sensitivity, or because of inter-element effects. The preconcentration of many cations in high yield from the matrix in a small volume of 12.2 M HCl or 12.2 M HCl-organic solvent provides easy coupling with emission spectrometry, flame photometry, or other sensitive methods of estimation.

The process of the present invention, is however, primarily intended as a purification process. Even in situations where some of the matrix breaks through and makes the system unsuitable for use in preconcentrating the trace elements for analytical purposes, the loss of minor amounts of matrix will not negate its use for purification of the matrix. The purified matrix is then recovered in any conventional manner such as by elution with water or other appropriate solvent systems.

We claim:
1. A method for the purification of Na, K, Sr or Ag cation containing trace cation impurities soluble in and capable of selective elution by 12.2 M hydrochloric acid which includes the steps of passing a solution containing the cation to be purified together with said trace impurities through a column of sulfonated divinylbenzene cross-linked polystyrene cation exchange resin to adsorb the cations present in the solution, passing 12.2 M hydrochloric acid through the resin to insolubilize the cation to be purified, passing further acid through the resin to elute the trace impurities, and recovering the thus purified cation from the resin.

2. A method for the purification of Li, Na, K, Rb, Mg, Ca, Sr, Sc, Y, La, Cr, Mn, Pb or Al cation containing trace cation impurities soluble in and capable of selective elution by 12.2 M hydrochloric acid which includes the steps of passing a solution containing the cation to be purified together with said trace impurities through a column of sulfonated divinylbenzene cross-linked polystyrene cation exchange resin to adsorb the cations present in the solution, passing 12.2 M hydrochloric acid admixed with a water miscible ether or alcohol through the resin to insolubilize the cation to be purified, passing further acid admixed with ether or alcohol through the resin to elute the trace impurities, and recovering the thus purified cation from the resin.

3. A method according to claim 2 wherein the ether is dioxane.

References Cited

Samuelson: "Ion Exchange Separations In Analytical Chemistry," John Wiley & Sons, Inc., New York, 1966, pp. 186–187.

Strelow: "Analytical Chemistry," vol. 31, December 1959, pp. 1974–1977.

HERBERT T. CARTER, Primary Examiner

U.S. Cl. X.R.

23—50, 87, 89, 90, 91, 92, 97, 338